No. 648,610. G. W. FRENCH. Patented May 1, 1900.
METHOD OF MAKING WHEELS.
(Application filed Mar. 8, 1900.)

(No Model.) 2 Sheets—Sheet 1.

Witnesses
F. S. Elmore.
G. M. Copenhaver.

Inventor
G. W. French
By P. T. Dodge Attorney

THE NORRIS PETERS CO., PHOTO-LITHO., WASHINGTON, D. C.

No. 648,610. Patented May 1, 1900.
G. W. FRENCH.
METHOD OF MAKING WHEELS.
(Application filed Mar. 8, 1900.)

(No Model.) 2 Sheets—Sheet 2.

Witnesses

Inventor
G. W. French
By P. T. Dodge
Attorney

UNITED STATES PATENT OFFICE.

GEORGE W. FRENCH, OF DAVENPORT, IOWA, ASSIGNOR TO THE BETTENDORF METAL WHEEL COMPANY, OF IOWA.

METHOD OF MAKING WHEELS.

SPECIFICATION forming part of Letters Patent No. 648,610, dated May 1, 1900.

Application filed March 8, 1900. Serial No. 7,811. (No model.)

*To all whom it may concern:*

Be it known that I, GEORGE W. FRENCH, of Davenport, county of Scott, and State of Iowa, have invented a new and useful Improvement in Methods of Making Wheels, of which the following is a specification.

This invention has reference to the production of metal wheels, the object being to produce a durable wheel of simple construction in which the spokes will be maintained under tension.

With this end in view my invention consists in bending the rim to extend outwardly between adjacent spokes beyond a circular line passing through the points of connection of the spokes with the rim and subsequently forcing the outwardly-bent portion or portions inward, whereby the tendency of the rim under these conditions to enlarge in diameter will exert an outward strain on the spokes and place them under tension. The bending of the rim in this manner may be accomplished in a variety of ways, either by giving the rim a curve having a smaller radius than the desired wheel and attaching the rim to the ends of spokes fixed to a hub, or forming a rim of greater diameter than the desired wheel and drawing the same inward at intervals to meet the spokes, or forming the rim in the first instance with a series of epicycloidal curves and attaching the ends of the spokes at the junctions of the curves, or forming the rim where its ends are joined to extend outwardly at this point only. In all these cases the rim is at one or more points so formed and connected with the spokes that it extends outward beyond a circular line passing through the points of connection of the spokes with the rim, the result being that when forced inward the tendency of the rim to enlarge in diameter will cause an outward strain to be exerted on the spokes, and this is the essence of the invention without regard to the manner of forming or attaching the rim or to the means of effecting the same.

Figure 1:
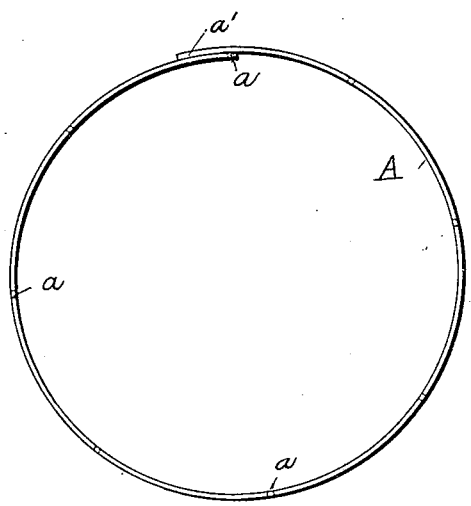
Figure 2:
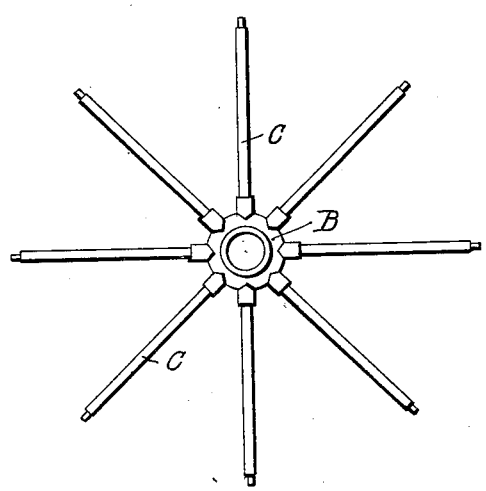
Figure 3:
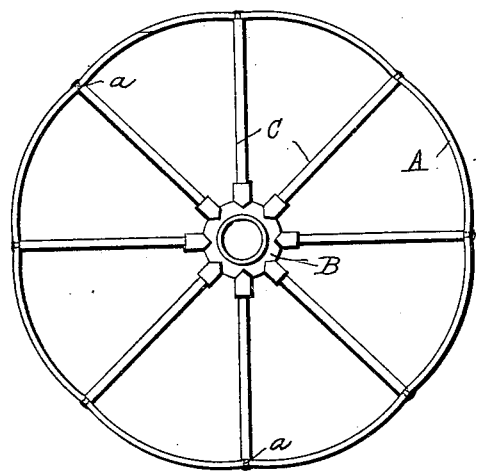
Figure 4:
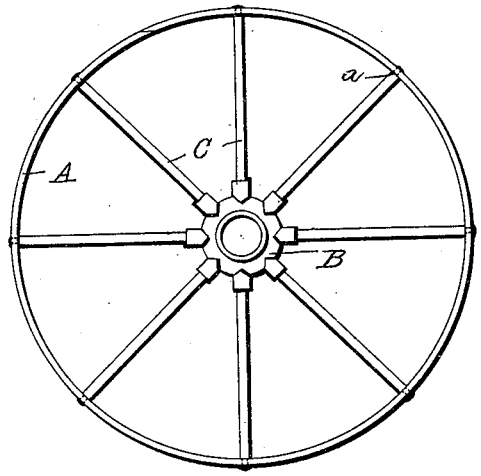
Figure 5:
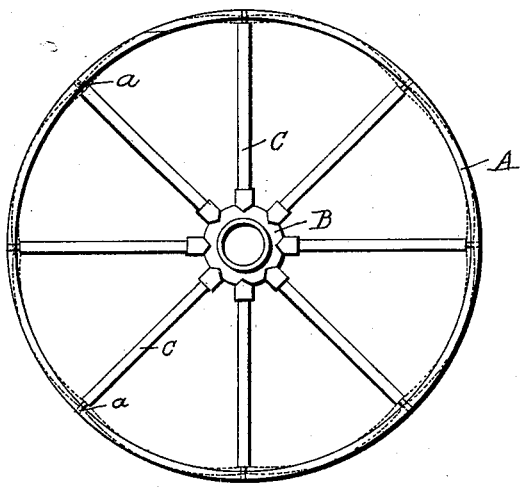
Figure 6:
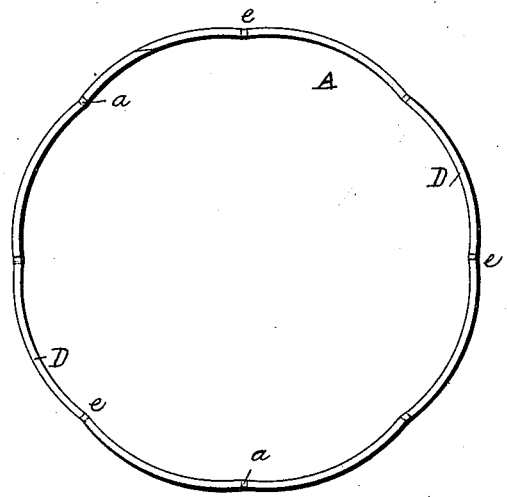
Figure 7:
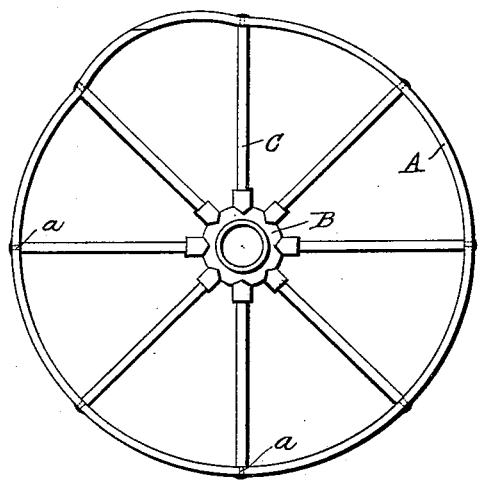

In the accompanying drawings, Figure 1 is an elevation of a rim bent with a curve less than that of the desired wheel. Fig. 2 is an elevation of a hub and a series of spokes fixed therein suitable for being attached to the rim represented in Fig. 1. Fig. 3 is an elevation of the hub, spokes, and rim connected and as they appear before being subjected to pressure to force the bulging portions inward. Fig. 4 is an elevation of the completed wheel. Fig. 5 is an elevation showing a rim greater in diameter than that of the desired wheel with the hub and spokes within the same. Fig. 6 is an elevation of a rim formed in the first instance with epicycloidal curves, and Fig. 7 is an elevation of a wheel with one portion of the rim only between adjacent spokes extending outward.

Referring particularly to Figs. 1, 2, 3, and 4, in carrying out my invention I provide a strip A of metal and I form in the same at intervals holes *a* to receive the outer ends of the spokes. This strip is of a length greater than is necessary for a wheel of the size desired, so that when bent outward between the spokes its ends will meet and may be connected. I bend same by any suitable means with a curve having a radius less than that of the wheel, and this will cause the ends of the rim to overlap, as at *a'*, Fig. 1. I next attach to a hub B, Fig. 2, a series of spokes C, which are passed through the holes in the rim and firmly secured therein, preferably by forming heads on the spokes. The ends of the rim are then secured together. Owing to the fact that the rim has a curve less than that of the desired wheel, whose diameter is the distance between the outer ends of diametrically-opposite spokes, the portions of the rim between the spokes will bulge or extend outward and will present the appearance illustated in Fig. 3. I next by suitable means, preferably by a shrinker, subject the outwardly-extending portions of the wheel to an inward pressure to bring these portions at or near a circular line passing through the points of connection of the rim with the ends of the spokes to remove unevenness in the surface. When these portions are thus forced inward, there is of course a tendency of the rim to enlarge in diameter, and this exerting an outward strain on the spokes will place them under tension.

While I prefer to carry my invention into effect in the foregoing manner, there are other ways by which it may be accomplished, and my invention is intended to embrace all of these. For instance, the rim may be formed with its ends connected and of a diameter greater than that of the desired wheel, as illustrated in Fig. 5, and this rim may be drawn in at intervals, as represented by dotted lines in said figure, to meet the ends of the spokes and may be secured at these points. This would produce a wheel with outwardly-extending portions, as in Fig. 3, and the spokes could be placed under tension by forcing the bulging portions inward, as in the first instance.

In Fig. 6 I have represented still another form of rim. Here the same is made of a series of outwardly-extending curves D, joining each other at points e. At these points the rim may be secured to the outer ends of spokes projecting from a hub, as in the other figures, and when so connected a wheel of the same appearance as those described is produced, which when subjected to pressure, as before, will place the spokes under tension.

While I prefer to bend the rim outward at intervals between adjacent spokes entirely around the wheel, as described, to insure uniformity of strain on the spokes, this is not absolutely essential, for good results may be obtained by bending the rim outward at but one point only, as shown in Fig. 7. Here it is seen that the rim, where its ends are connected, is bent outward, it being more convenient to bend the rim outward while forming this joint than while the spokes are being connected.

Having thus described my invention, what I claim is—

1. In the method of making metal wheels, bending the rim to extend outwardly between adjacent spokes beyond a circular line passing through the points of connection of the rim with the spokes, and subsequently forcing the outwardly-extending portion or portions inward.

2. In the method of making metal wheels, bending the rim at intervals between the spokes outwardly beyond a circular line passing through the points of connection of the rim with the spokes, and subsequently forcing the outwardly-extending portions inward.

3. In the method of making metal wheels, providing a strip, bending this strip with a curve having a radius less than that of the desired wheel, providing a hub and spokes, securing the ends of the spokes to the strip at intervals; whereby the strip will bulge outwardly between adjacent spokes, and finally forcing these bulging portions of the rim inward.

4. The method of making metal wheels which consists in providing a strip of greater length than the circumference of the desired wheel and formed at intervals with holes to receive the spokes, bending this strip with a curve having a radius less than that of the desired wheel, providing a hub with spokes rigidly attached, passing the ends of the spokes through the holes in the rim, securing the spokes thereto, and joining the ends of the rim; whereby the rim between the spokes will bulge outwardly, and finally forcing these outwardly-bulging portions of the rim inward.

In testimony whereof I hereunto set my hand, this 3d day of March, 1900, in the presence of two attesting witnesses.

GEORGE W. FRENCH.

Witnesses:
NATH FRENCH,
MAY L. DODGE.